3,753,988
SUBSTITUTED PHTHALAZINES
Ronald Ernest Rodway, Bourne End, Buckinghamshire, and Robin George Simmonds, Wokingham, Berkshire, England, assignors to Aspro-Nicholas Limited, London, England
No Drawing. Filed Apr. 30, 1970, Ser. No. 33,506
Claims priority, application Great Britain, May 3, 1969, 22,679/69
Int. Cl. C07d 51/04
U.S. Cl. 260—250 A                    12 Claims

ABSTRACT OF THE DISCLOSURE

Pharmacologically active phthalazines are provided having the formula:

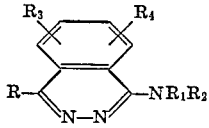

as well as pharmaceutical compositions containing these, and a method of anti-inflammatory treatment, comprising the administration of such compounds to an animal.

---

This invention relates to pharmacologically active phthalazines, to a method for their preparation, to pharmaceutical compositions containing them and to a method of treatment involving their use.

The phthalazines of the present invention are represented by the formula:

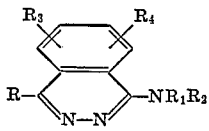

and acid addition salts and quaternary ammonium derivatives thereof wherein

R represents hydrogen; alkyl; cycloalkyl; aryl; aralkyl; or the group —$NR_1R_2$;

$R_1$ and $R_2$, which may be the same or different, represent hydrogen; cycloalkyl; or cycloalkyl-alkyl; provided that both $R_1$ and $R_2$ are not hydrogen; or $R_1$ and $R_2$ separately represent the same or different heterocyclic or heterocyclic-alkyl or, together with the adjacent nitrogen, represent heterocyclic, the said heterocyclic groups being rings of 5 to 7 atoms at least one of which atoms is carbon, and at least one and optionally up to four of which atoms are hetero atoms selected from nitrogen, oxygen or sulphur; and $R_3$ and $R_4$, which may be the same or different, represent hydrogen; halogen; cyano; hydroxy; nitro; amino; alkylamino; carboxy; carboxyamido; alkyl; alkylcarbonyl; alkoxy; alkoxycarbonyl; hydroxy alkyl; halogenoalkyl; or alkyl- or aryl-thio, -sulphinyl or -sulphonyl.

The aforementioned heterocyclic rings may be unsubstituted or substituted by alkyl; hydroxyalkyl; halogenoalkyl; aryl; aralkyl; carboxyalkyl; alkoxy- or aralkoxyalkyl; alkoxy- or aralkoxy-carbonyl; alkoxy- or aralkoxy-carbonylalkyl; alkyl- or aryl-sulphonyloxyalkyl; aminoalkyl; alkylaminoalkyl; acyl; or acyl- or acyloxy-alkyl; or by a further heterocyclic or heterocyclic-alkyl group, the heterocyclic rings of which have 5 to 7 atoms, one or two of which are hetero-atoms selected from nitrogen, oxygen or sulphur and the remainder of which ring atoms are carbon, which rings are themselves optionally substituted by alkyl, hydroxyalkyl or halogenoalkyl.

By "aryl" as used herein we mean to include phenyl and phenyl substituted by one or more of the same or different halogen; cyano; hydroxy; nitro; amino; alkylamino; carboxy; carboxyamido; alkyl; alkylcarbonyl; alkoxy; alkoxycarbonyl; hydroxyalkyl; halogeno-alkyl; or alkyl-, phenyl- or alkylphenyl-thio, -sulphinyl or -sulphonyl.

By "alkyl" as used herein whether explicitly (except in the term cycloalkyl) or implicitly as in, for example, acyl (i.e. alkylcarbonyl), we mean to include straight and branched chain radicals of up to 12 carbons which are saturated or unsaturated by one or more double or triple bonds.

Examples of suitable heterocyclic and heterocyclicalkyl and, subject to the restrictions in the definition above, heterocyclic-substituted heterocyclic radicals are imidazolidinyl, imidazolinyl, pyrazolidinyl, pyrazolinyl, piperidyl, picolyl, pyridylethyl, homopiperidyl, thiazolinyl, thiazolyl, homopiperazinyl, homomorpholinyl, piperazinyl, morpholinyl, morpholinylpropyl, thiazinyl, thiazolidinyl, pyrrolyl, imidazolyl, pyrazolyl, pyrrolidinyl, piperidinyl, pyrrolinyl, piperidylmethyl, morpholinylethyl, 4-methylpiperazinyl, 2 - phenylpiperidyl, 3-aminomethylpyrrolidinyl, 3-chloroethylpiperidyl, 3-hydroxypyrrolidinyl, 2-methoxyethylmorpholinyl, 4-phenylpiperazinyl, o-tolylpiperazinyl, triazolyl, tetrazolyl, oxadiazolyl, thienyl, hydroxyethylpiperazinyl, acetoxyethylpiperazinyl, 4-picolylpiperazinyl, methylsulphonyloxyethylpyrazolinyl, piperidinylpropylpiperidinyl and the like.

Examples of suitable aryl and aralkyl radicals include phenyl, tolyl, xylyl, cumenyl, 2,3-dimethoxyphenyl, chlorophenyl, 2,4-dibromophenyl, cyanophenyl, hydroxyphenyl, methylthiophenyl, 4-(o-tolylsulphinyl)phenyl, benzyl, styryl, phenethyl, 2,3-xylylmethyl, 3-ethylsulphonylphenyl, 2,4-dimethoxybenzyl, 2,3,6 - trichlorobenzyl, γ-phenylpropyl, 4-(o-tolyl)butyl, 2-(2′,4′-dimethoxyphenyl) ethyl, 1-methyl-2-phenylethyl, 3-fluorophenylalkyl, 2-methyl-3-phenylpropyl, 3-phenylprop-2-ynyl, 2-chloro-3, 5-dimethylphenyl and 2-benzylbut-1-enyl.

Examples of suitable alkyl radicals are methyl, ethyl, propyl, butyl, amyl, hexyl, heptyl, octyl, nonyl, decyl, undecyl, dodecyl, ethenyl, ethynyl, prop-1-enyl, prop-2-enyl (i.e. allyl), prop-1-ynyl, prop-2-ynyl (i.e. propargyl), but-1-enyl, but-1-ynyl, but-2-enyl, but-2-ynyl, but-3-enyl, pent-1-enyl, pent-2-enyl, pent-2-ynyl, pent-4-ynyl, 2-methylbut-1-enyl, 3-methylbut-1-ynyl, 2 - methylbut - 2-enyl, and 1,1-dimethylprop-2-enyl.

Examples of suitable cycloalkyl radicals include cyclopropyl, cyclobutyl, cyclopentyl, cyclohexyl, cycloheptyl and cyclooctyl.

A particularly preferred group of compounds of Formula I are those in which

R represents hydrogen; lower alkyl; cycloalkyl of 3 to 6 carbons; phenyl or phenyl-lower alkyl (the phenyl or phenyl moiety of which is optionally substituted by halogen; cyano; hydroxy; nitro; amino; lower alkylamino; lower alkyl; lower alkylcarbonyl; lower alkoxy lower alkoxycarbonyl hydroxy lower alkyl; halogeno lower alkyl; or lower alkyl-thio, -sulphinyl or -sulphonyl); or the group —$NR_1R_2$;

$R_3$ and $R_4$, which may be the same or different, represent hydrogen; halogen; cyano; hydroxy; nitro; amino; lower alkylamino; lower alkyl; lower alkylcarbonyl lower alkoxy lower alkoxycarbonyl hydroxy lower alkyl; halogeno lower alkyl; or lower alkyl-thio, -sulphinyl or -sulphonyl;

$R_1$ represents hydrogen;

$R_2$ represents cycloalkyl or cycloalkyl-lower alkyl (the cycloalkyl or cycloalkyl moiety of which has 3 to 6 carbons); or heterocyclic or heterocyclic-lower alkyl; or $R_1$ and $R_2$, together with the adjacent nitrogen, represent a heterocyclic ring; the heterocyclic rings represented by $R_2$, or $R_1$ and $R_2$ together, having from 5 to 6 ring atoms, at least one of which is carbon and at least one, and optionally up to 4, of which atoms are heteroatoms selected from nitrogen, oxygen or sulphur, which heterocyclic rings are optionally substituted by lower alkyl; hydroxy- or halogeno-lower alkyl; phenyl; phenyl(lower)alkyl; carboxy(lower)alkyl; lower alkoxy- or phenyl(lower)alkoxy-lower alkyl; lower alkoxy-carbonyl or -carbonyl(lower) alkyl; lower alkyl- or phenyl-sulphonyloxy-(lower)alkyl; amino(lower)alkyl; lower alkylamino(lower)alkyl; lower acyl; lower acyl- or lower acyloxy-lower alkyl; or by a further heterocyclic or heterocyclic-lower alkyl group, the further heterocyclic rings having from 5 to 6 ring atoms, one or two of which are heteroatoms selected from nitrogen, oxygen or sulphur and the remainder of which ring atoms are carbon, which further rings are optionally substituted by lower alkyl, hydroxy- or halogeno-lower alkyl, the phenyl substituents or the phenyl moiety of substituents on the aforementioned heterocyclic rings being optionally substituted by halogen, cyano, hydroxy, amino, lower alkylamino, lower alkyl or lower alkoxy.

Within the aforementioned preferred group of compounds, particularly useful pharmacological properties are to be found in compounds of Formula I in which $R_3$ and $R_4$, which may be the same or different, represent hydrogen or halogen;

R represents hydrogen, alkyl of 1 to 4 carbons, cycloalkyl of 3 to 6 carbons, phenyl or benzyl, the phenyl or phenyl moiety of which is optionally substituted by halogen, cyano, hydroxy, amino, alkylamino, alkyl, alkoxy or alkylthio (the alkyl or alkoxy moieties of which groups have 1 to 4 carbons); and either $R_1$ represents hydrogen and $R_2$ represents cycloalkyl of 3 to 6 carbons, heterocyclic or heterocyclic-lower alkyl, or $R_1$ and $R_2$, together with the adjacent nitrogen, represent a heterocyclic ring;

the heterocyclic rings of $R_2$, or $R_1$ and $R_2$ together, having from 5 to 6 ring atoms up to two of which are nitrogen, up to one of which is oxygen, and the remainder of which are carbon, which heterocyclic rings are optionally substituted by alkyl, hydroxyalkyl or halogenoalkyl of 1 to 4 carbons; phenyl or benzyl; methoxy- or ethoxy- carbonyl, -carbonylmethyl or -carbonylethyl; acetyl, or propionyl; acetyl-, propionyl-, acetyloxy- or propionyl- oxy-methyl or -ethyl; or by a further heterocyclic or heterocyclic- methyl, ethyl, propyl or butyl, the further heterocyclic rings having from 5 to 6 ring atoms, up to two of which are nitrogen, up to one of which is oxygen and the remainder of which are carbon, which further rings are optionally substituted by alkyl, hydroxyalkyl or halogenoalkyl of 1 to 4 carbons, the phenyl substituents or the phenyl moiety of substituents on the heterocyclic rings being optionally substituted by halogen; hydroxy; methyl; ethyl; methoxy or ethoxy.

Where in this specification reference is made to a substituent without reference to its isomeric state, that substituent includes all its isomers, e.g. reference to butyl includes n-butyl, iso-butyl, s-butyl and t-butyl.

The term "lower" in qualifying various groups is used herein to mean those groups containing up to 6 carbon atoms.

According to a feature of the present invention, there is provided a process for preparing the phthalazines of the present invention which comprises reacting a compound of the formula:

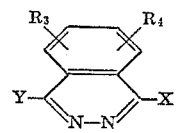

(II)

wherein $R_3$ and $R_4$ are as defined in Formula I, Y represents alkyl; cycloalkyl; aryl; or aralkyl; or, where R in Formula I is the group —$NR_1R_2$, Y represents a group as defined by X; and X represents halogen, or alkyl- or aryl-thio, -sulphinyl or -sulphonyl; with an amine, or an acid addition salt thereof, of the formula:

$$HNR_1R_2 \qquad (III)$$

wherein $R_1$ and $R_2$ are as defined in Formula I.

The reaction may be carried out in the presence or absence of a solvent and normally will be carried out at elevated temperatures. When a solvent is used, the reaction is conveniently carried at the reflux temperature of the reaction mixture. Reaction times may vary from about 1 to 24 hours depending on the reaction conditions. When a solvent is used, suitable solvents include benzene, chloroform, toluene, acetone, dioxan, dimethylformamide, dimethylsulphoxide, and the like.

If desired, a substituent on a compound prepared according to the foregoing process may be converted to another substituent falling within the defined substituents in Formula I. These conversions are carried out by methods well known per se. Thus, for example, a hydroxyalkyl substituent may be converted to a halogenoalkyl substituent by reaction with a halogenating agent such as thionyl chloride, phosphorus tribromide in the presence of an inert solvent such as chloroform. An alkoxycarbonyl substituent may be converted to a hydrogen atom by the action of heat under basic conditions. A hydroxyalkyl substituent may be converted to an acyloxyalkyl substituent by action of a suitable acylating agent usually at elevated temperatures.

An unsubstituted imino group, for example in a piperazinyl group, may be alkylated or acylated using conventional means such as by reaction with an alkylating or acylating agent for example an alkyl or acyl halide. Similarly the replacement of the imino hydrogen with an alkoxycarbonylalkyl group may be accomplished by reaction with an α-halogeno alkanoic ester.

It will be clear to those skilled in the art that other substituents may likewise be converted and accordingly a feature of the process of the present invention includes the optional conversion by methods known per se of a substituent on the compound produced by reacting compounds of Formulae II and III to another substituent falling within the definition of substituents on compounds of Formula I.

The compounds produced by the foregoing process may be isolated either per se or as acid addition salts or quaternary ammonium derivatives thereof.

The acid addition salts are preferably the pharmaceutically acceptable, non-toxic addition salts with suitable acids, such as those with inorganic acids, for example hydrochloric, hydrobromic, nitric, sulphuric or phosphoric acids, or with organic acids, such as organic carboxylic acids, for example, glycollic, maleic, hydroxymaleic, malic, tartaric, citric, salicylic, o-acetyloxybenzoic, nicotinic or isonicotinic acid, or organic sulphonic acids for example methane sulphonic, ethane sulphonic, 2 - hydroxyethane sulphonic, toluene-p-sulphonic, or naphthalene-2-sulphonic acid. Apart from pharmaceutically acceptable acid addition salts, other salts are also included within the scope of acid addition salts such as, for example, those with picric or oxalic acid; they may serve as intermediates in the purification of the compounds or in the preparation of other, for example, pharmaceutically acceptable, acid addition salts, or are useful for identification, characterization or purification of the bases.

A resulting acid addition salt may be converted into the free compound according to known methods, for example, by treating it with a base, such as with a metal hydroxide or alkoxide, for example an alkali metal or alkaline earth metal hydroxide, for example, lithium hydroxide, sodium hydroxide, potassium hydroxide or calcium hydroxide; with a metal carbonate, such as an alkali metal or an alkaline earth metal carbonate or hydrogen carbonate, for example, sodium, potassium or calcium carbonate or hydrogen carbonate; with ammonia; or with a hydroxyl ion exchange preparation, or with any other suitable reagent.

A resulting acid addition salt may also be converted into another acid addition salt according to known methods; for example, a salt with an inorganic acid may be treated with a metal salt, for example a sodium, barium or silver salt, of an acid in a suitable diluent, in which a resulting inorganic salt is insoluble and is thus removed from the reaction medium. An acid addition salt may also be converted into another acid addition salt by treatment with an anion exchange preparation.

Quaternary ammonium derivatives of the compounds of this invention are particularly those formed by reaction with lower alkyl halides, for example, methyl, ethyl, or propyl chloride, bromide or iodide; di-lower alkyl sulphates, for example, dimethyl or diethyl sulphate; lower alkyl lower alkane sulphonates, for example, methyl or ethyl methane sulphonate or ethane sulphonate; lower alkyl aryl sulphonates, for example methyl or ethyl p-toluene sulphonates; and phenyl-lower alkyl halides, for example benzyl or phenethyl chloride, bromide or iodide. Also included are the quaternary ammonium hydroxides and the quaternary ammonium compounds having as anions those of other inorganic or organic acids, for example those of the acids used for the preparation of the previously-mentioned acid addition salts.

The compounds of the present invention possess useful pharmacological properties. Such properties include anti-inflammatory activity and in particular anti-rheumatic activity. Certain of the compounds of Formula I also appear to produce an immunosuppressive effect in the animal body.

In the method aspect of the invention, there is provided a method of treating inflammation in animals comprising administering to said animals an amount effective to reduce inflammation of a phthalazine derivative as hereinbefore defined or an acid addition salt or quaternary ammonium derivative thereof.

In the composition aspect of the invention there are provided pharmaceutical formulations in which form the active compounds of the invention will normally be utilised. Such formulations are prepared in a manner well known in the pharmaceutical art and usually comprise at least one active compound of the invention in admixture or otherwise in association with a pharmaceutically acceptable carrier therefor. For making these formulations the active ingredient will usually be mixed with a carrier, or diluted by a carrier, or enclosed or encapsulated in a capsule, sachet, cachet, paper or other container. A carrier or diluent may be a solid, semi-solid or liquid material which serves as a vehicle, excipient or medium for the active ingredient. Some examples of such diluents or carriers are lactose, dextrose, sucrose, sorbitol, mannitol, starches, gum acacia, calcium phosphate, liquid paraffin, cocoa butter, oil of theobroma, alginates, tragacanth, gelatin, syrup B.P., methyl cellulose, polyoxyethylene sorbitan monolaurate, methyl- and propyl- hydroxybenzoate, talc, magnesium stearate or mineral oil.

The formulations of the invention may be adapted for enteral or parenteral use and may be administered to a subject requiring treatment, for example an animal suffering an inflammatory condition, in the form of tablets, capsules, suppositories, solutions, suspensions or the like. The dosage required for the treatment of any animal will usually fall within the range of about 0.01 to 250 mg./kg. For example in the treatment of adult humans, each dosage of active ingredient will normally be from about 0.01 to 15 mg./kg., whereas in the treatment of test animals such as mice and rabbits a dosage of 10 to 200 mg./kg. may be used. The formulations of the invention may therefore be provided in dosage unit form, preferably each dosage unit containing from 1 to 1000 mg., more advantageously from 5 to 500 mg., and most preferably from 10 to 250 mg. of the active ingredient of the invention.

The following examples will further illustrate the preparation of the novel compounds of this invention:

EXAMPLE 1

1 - chloro - 4 - phenylphthalazine (10 g.) and N-methylpiperazine (8.5 g.) in dry benzene (40 ml.) were heated under reflux for 5½ hours. The solvent was evaporated off and the residue treated with water. This product was extracted with chloroform and removal of the solvent provided the crude base. On recrystallisation from benzene/light petroleum (B.P. 40–50° C.), 1-(4'-methyl-1'-piperazinyl)-4-phenylphthalazine, M.P. 160–2° C. (9.1 g. 72%) was obtained.

EXAMPLE 2

1 - chloro - 4 - phenylphthalazine (48.1 g.) and N-(2-hydroxyethyl)piperazine (52 g.) in dry dioxan (200 ml.) were heated under reflux for 3 hours. The solvent was evaporated off under reduced pressure and water was added to the residue. The product was extracted with chloroform, removal of the solvent gave the crude base, and recrystallisation from methanol provided crystals of 1 - [4' - ($\beta''$-hydroxyethyl)piperazine - 1'-yl]-4-phenylphthalazine, M.P. 223–5° C. (53 g., 79%).

EXAMPLE 3

To chlorophthalazine (14.5 g.) in dry dioxan (100 ml.) was added N-(2-hydroxyethyl)piperazine (23 g.) and the mixture heated in an oil bath (temperature 110–115° C.) for 18 hours. (A dark oil separated which solidified on cooling.) The solvent was removed under reduced pressure and the residue was treated with water and then extracted with chloroform. Removal of solvent provided the product as an oil, which was treated with ether under reflux to provide a yellow granular solid. Recrystallisation from benzene gave 1-[4'-($\beta''$-hydroxyethyl)piperazine-1'-yl]phthalazine, M.P. 111–113° C. (10 g.).

EXAMPLE 4

To N-ethoxycarbonylpiperazine (17 g.) in dry dioxan (50 ml.) was added 1-chloro-4-phenyl phthalazine (12.8 g.) and the solution heated under reflux for 2 hours. The solvent was then removed under reduced pressure and the residue treated with water and extracted with chloroform. The chloroform was removed under reduced pressure and the gummy residue granulated under light petroleum (B.P. 40–60° C.) to provide a crude product. Recrystallisation from isopropanol (130 ml.) gave 1-(4'-ethoxycarbonyl-piperazin-1'-yl)-4-phenylphthalazine, M.P. 144–6° C. (12.7 g., 66%).

EXAMPLE 5

1 - chloro - 4 - phenylphthalazine (16 g.) and N-aminopropyl morpholine (23 g.) in dry dioxan (65 ml.) were heated under reflux for 2½ hours. The solvent was then distilled off under reduced pressure and water was added to the residue. The product obtained via extraction with chloroform was granulated under light petroleum to give the crude amine. Recrystallisation from ethyl acetate (150 ml.) provided 1 - [(3' - morpholinopropyl)amino]-4-phenyl phthalazine, M.P. 127° C. (18 g., 78%).

EXAMPLE 6

A solution of 1 - chloro-4-(p-chlorophenyl)phthalazine (13.7 g.) and N-($\beta$-hydroxyethyl)piperazine (13 g.) in dry dioxan (70 ml.) was heated under reflux with stirring for 3 hours. After cooling, the solution was poured into water (500 ml.) and the resulting precipitate was filtered off, washed with water, dried and recrystallised from methanol to yield 1-(4'-$\beta$-hydroxyethylpiperazine-1'-yl)-4-(p-chlorophenyl)phthalazine, M.P. 210–2° C. (12.2 g., 64%).

EXAMPLE 7

1 - chloro - 4 - phenylphthalazine (16 g.) and piperidine (13.5 g.) in dry dioxan (60 ml.) were heated under reflux for 2 hours. After standing overnight, the solvent was evaporated off under reduced pressure and water (600 ml.) was added to the residue. The solids were filtered off, washed well with water, and dried in a vacuum desiccator. The crude product was recrystallised from methanol to yield 1-(piperidin-1'yl)-4-phenylphthalazine (10.5 g. 55%) M.P. 158–9° C. A further crop (2.8 g.) M.P. 158–9° C. was obtained from the mother liquors.

EXAMPLE 8

By methods similar to those described above, the following compounds were prepared:

1-(pyrrolidin-1'-yl)-4-phenylphthalazine, M.P. 116–8° C. yield 55%).
1-(4'-o.tolylpiperazin-1'-yl)-4-phenylphthalazine, M.P. 204–5° C. (yield 80%).
1-[4'-[1''-(1'''-β-hydroxyethylpiperidin-4'''-yl)prop-3''-yl]piperidin-1'-yl]-4-phenylphthalazine, M.P. 155–7° C. (yield 66%).
1-(4'-β-hydroxyethylpiperidinyl)-4-phenylphthalazine, M.P. 185–7° C. (yield 68%).
1-(4'-β-hydroxyethylpiperazin-1'-yl)-4-benzylphthalazine, M.P. 145–6° C.
1-(4'-β-hydroxypropylpiperazin-1'-yl)-4-phenylphthalazine hydrate, M.P. 89–90° C. (yield 61%).
1-(4'-β-hydroxyethylpiperazin-1'-yl)-4-n.butylphthalazine dihydrogen maleate, M.P. 144–6° C. (yield 35%).
1-(morpholin-4'-yl)-4-phenylphthalazine, M.P. 193–5° C. (yield 39%).
1-(4'-β-hydroxyethylpiperazin-1'-yl)-4-cyclohexylphthalazine, M.P. 220–2° C.
1-cyclopropylamino-4-phenylphthalazine, M.P. 195–6° C.
1-cyclopentylamino-4-phenylphthalazine, M.P. 192–3° C.
1-cyclopropylamino-4-p-chlorophenylphthalazine, M.P. 190–2° C.
1-cyclopropylamino-4-benzylphthalazine, M.P. 151–3° C.
1-cyclohexylamino-4-phenylphthalazine, M.P. 300–3° C.
1-(4'-phenylpiperazin-1'-yl)-4-phenylphthalazine, M.P. 218–20° C.
1-(4'-β-hydroxyethylpiperazin-1'-yl)-4-phenyl-7-chlorophthalazine, M.P. 176–7° C.
1-(4'-β-hydroxyethylpiperazin-1'-yl)-4-(3'-chloro-4'-methylphenyl)phthalazine, M.P. 140–2° C.
1-(4'-β-hydroxyethylpiperazin-1'-yl)-4-(2'-methoxyphenyl)phthalazine hydrate, M.P. ca. 100° C.
1-(4'-β-hydroxyethylpiperazin-1'-yl)-4-(4'-cyanophenyl)phthalazine, M.P. 221–2° C.
1-(4'-acetylpiperazin-1'-yl)-4-phenylphthalazine monohydrate, M.P. 125° C. (with effervescence).
1-(4'-β-hydroxyethylpiperazin-1'-yl)-4-(4'-methylthiophenyl) phthalazine, M.P. 162–3° C.
1-(2'-morpholinoethylamino)-4-phenylphthalazine, M.P. 138–9° C. (yield 50%).
1-(4'-β-hydroxyethylpiperazin-1'-yl)-4-(4'-methoxyphenyl)phthalazine, M.P. 161–3° C. (yield 69%).
1-[4'-(pyrrolidin-1''-yl)piperidin-1'-yl]-4-phenylphthalazine, M.P. 157–8° C. (yield 35%).
1-(4'-methylpiperidin-1-yl)-4-phenylphthalazine, M.P. 143–4° C. (yield 54%).

EXAMPLE 9

To a stirred solution of 1-[4'-β-hydroxyethyl piperazin-1'-yl]-4-phenyl phthalazine (16.7 g.) in dry dioxan (250 ml.) was added slowly acetyl chloride (7.9 g.); after completion of the addition the mixture was heated under reflux for 2½ hours. The product was filtered cold and the solids (ca. 20.7 g., M.P. 234–7°) dissolved in water (100 ml.) and basified with aqueous sodium bicarbonate solution. The precipitated solids were extracted with chloroform and the combined extracts washed and dried (MgSO₄). The solvent was evaporated off to provide the crude acetate as a yellow solid M.P. 105–7° C. (17 g. ca. 90%). Recrystallisation from ethyl acetate/light petroleum (B.P. 40–60° C.) provided 1-[4'-(2''-acetoxyethyl)-piperazin-1'-yl]-4-phenylphthalazine, M.P. 110–112° C.

EXAMPLE 10

1-(4'-ethoxycarbonylpiperazine - 1' - yl) - 4 - phenyl phthalazine (16.3 g.) was added to an aqueous alcoholic sodium hydroxide solution prepared by dissolving sodium hydroxide (5.5 g.) in water (5.5 ml.) and diluting with alcohol (50 ml.), and the mixture heated under reflux for two hours. The cold mixture was acidified with dilute acetic acid, concentrated to small volume and then treated with excess water. The product was filtered, and the filtrate basified with dilute ammonium hydroxide solution. The precipitate was filtered off, washed with water and dried to yield the crude amine. Recrystallisation from aqueous alcohol provided 1-(piperazin-1'-yl)-4-phenylphthalazine monohydrate, M.P. 176–8° C.

EXAMPLE 11

1(-piperazin - 1'-yl)-4-phenylphthalazine monohydrate (10.7 g.) was dehydrated by azeotroping with chloroform in a water separator and after evaporation of the solvent, dry dimethylformamide (100 ml.) was added to the residual anhydrous amine followed by powdered anhydrous potassium carbonate (4.8 g. 2 equivs.). To the stirred suspension at room temperature was added slowly methyl chloroacetate (4.15 g.) and then the mixture was heated on a steam bath with stirring for 1½ hours. The solvent was partially removed under reduced pressure, the product treated with excess water and was then extracted with chloroform. The solvent was evaporated off and the residual gum washed with light petroleum (B.P. 40–60° C.). Recrystallisation from ethyl acetate/light petroleum (B.P. 40–60° C.) gave fine needles of methyl[4'-(4''-phenylphthalazine-1''-yl)piperazin-1'-yl]acetate, M.P. 140–1° C. (6.8 g. 55%).

EXAMPLE 12

By the method of Example 11 using allyl bromide in place of methylchloroacetate, 1-(4'-allyl-1'-piperazinyl)-4-phenylphthalazine, M.P. 156–7° C. was obtained.

In the following examples of pharmaceutical compositions, the term "medicament" is used to indicate the compound 1-(4'-β-hydroxyethylpiperazin - 1' - yl)-4-phenylphthalazine. That compound may of course be replaced in these compositions by any other compound of the invention and the amount of medicament may be increased or decreased as is well known in the art depending on the degree of activity of the medicament used.

EXAMPLE 13.—TABLET FORMULATION

|  | Mg./tablet |
| --- | --- |
| Medicament | 15 |
| Lactose | 86 |
| Maize starch (dried) | 45.5 |
| Gelatin | 2.5 |
| Magnesium stearate | 1.0 |

The medicament was powdered and passed through a B.S. No. 100 sieve and well mixed with the lactose and 30 mg. of the maize starch, both passed through a B.S. No. 44 sieve.

The mixed powders were massed with a warm gelatin solution prepared by stirring the gelatin in water and heating to form a 10% w./w. solution. The mass was granulated by passing through a B.S. No. 12 sieve and the moist granules dried at 40° C.

The dried granules were re-granulated by passing through a B.S. No. 14 sieve and the balance of the starch sieved 44 mesh and the magnesium stearate sieved 60 mesh were added and thoroughly mixed.

The granules were compressed to produce tablets each weighing 150 mg.

EXAMPLE 14.—TABLET FORMULATION

|  | Mg./tablet |
|---|---|
| Medicament | 100 |
| Lactose | 39 |
| Maize starch (dried) | 80 |
| Gelatin | 4.0 |
| Magnesium stearate | 2.0 |

The method of preparation is identical with that of Example 13 except that 60 mg. of starch is used in the granulation process and 20 mg. during tabletting.

EXAMPLE 15.—CAPSULE FORMULATION

|  | Mg./capsule |
|---|---|
| Medicament | 250 |
| Lactose | 150 |

The medicament and lactose were passed through a No. 44 B.S. sieve and the powders well mixed together before filling into hard gelatin capsules of suitable size, so that each capsule contained 400 mg. of mixed powders.

EXAMPLE 16.—SUPPOSITORIES

|  | Mg./suppository |
|---|---|
| Medicament | 50 |
| Oil of Theobroma | 950 |

The medicament was powdered and passed through a B.S. No. 100 sieve and triturated with molten oil of Theobroma at 45° C. to form a smooth suspension.

The mixture was well stirred and poured into moulds, each of nominal 1 g. capacity, to produce suppositories.

EXAMPLE 17.—CACHETS

|  | Mg./catchet |
|---|---|
| Medicament | 100 |
| Lactose | 400 |

The medicament was passed through a B.S. No. 40 mesh sieve, mixed with lactose previously sieved 44 mesh and filled into cachets of suitable size so that each contained 500 mg.

EXAMPLE 18.—INTRAMUSCULAR INJECTION (SUSPENSION IN AQUEOUS VEHICLE)

|  | Mg. |
|---|---|
| Medicament | 10 |
| Sodium citrate | 5.7 |
| Sodium carboxymethylcellulose (low viscosity grade) | 2.0 |
| Methyl para-hydroxybenzoate | 1.5 |
| Propyl para-hydroxybenzoate | 0.2 |
| Water for injection, to 1.0 ml. |  |

The sodium citrate and sodium carboxymethylcellulose were mixed with sufficient water for injection at 80° C. The mixture was cooled to 50° C. and the methyl and propyl parahydroxybenzoates added followed by the medicament previously milled and sieved 300 mesh. When cool the injection was made up to volume and sterilized by heating in an autoclave.

We claim:

1. A phthalazine compound having the formula

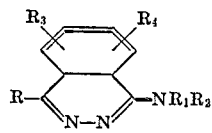

or the pharmaceutically acceptable non-toxic acid addition salts thereof, wherein:

R is selected from the group consisting of phenyl; cyanophenyl; methylphenyl; chlorophenyl; and methoxyphenyl;

$R_1$ and $R_2$ taken together with the adjacent nitrogen represent 4-X-substituted piperazin-1'-yl, where X is selected from the group consisting of hydrogen, $\beta$-hydroxyethyl, ethoxycarbonyl, acetyl, acetyloxyethyl and allyl;

$R_3$ and $R_4$ are selected from the group consisting of hydrogen and chlorine.

2. A phthalazine compound in accordance with claim 1 in which R is phenyl, $R_3$ and $R_4$ are hydrogen, and $NR_1R_2$ is 4'-($\beta''$-hydroxyethyl)piperazine-1'-yl.

3. A phthalazine compound in accordance with claim 1 in which R is p-chlorophenyl, $R_3$ and $R_4$ are hydrogen, and $NR_1R_2$ is 4'-($\beta''$-hydroxyethyl)piperazine-1'-yl.

4. A phthalazine compound in accordance with claim 1 in which R is phenyl, $R_3$ and $R_4$ are hydrogen, and $NR_1R_2$ is [4'-($\beta''$-hydroxypropyl)piperazine-1-yl] 4'-ethoxycarbonylpiperazin-1'-yl.

5. A phthalazine compound in accordance with claim 1 in which R is phenyl, $R_3$ is hydrogen, $R_4$ is chlorine, and $NR_1R_2$ is 4'-($\beta''$-hydroxyethyl)piperazine-1'-yl.

6. A phthalazine compound in accordance with claim 1 in which R is m-chloro-p-methylphenyl, $R_3$ and $R_4$ are hydrogen, and $NR_1R_2$ is 4'-($\beta''$-hydroxyethyl)piperazine-1'-yl.

7. A phthalazine compound in accordance with claim 1 in which R is p-cyanophenyl, $R_3$ and $R_4$ are hydrogen, and $NR_1R_2$ is 4'-($\beta''$-hydroxyethyl)piperazine-1'-yl.

8. A phthalazine compound in accordance with claim 1 in which R is phenyl, $R_3$ and $R_4$ are hydrogen, and $NR_1R_2$ is [4'-($\beta''$-hydroxyethyl)piperazine-1-yl] 4'-acetyl-piperazin-1'-yl.

9. A phthalazine compound in accordance with claim 1 in which R is o- or p-methoxyphenyl, $R_3$ and $R_4$ are hydrogen, and $NR_1R_2$ is 4'-($\beta''$-hydroxyethyl)-piperazine-1'-yl.

10. A phthalazine compound in accordance with claim 1 in which R is phenyl, $R_3$ and $R_4$ are hydrogen, and $NR_1R_2$ is 4'-.2''-acetyloxyethyl)piperazin-1'-yl.

11. A phthalazine compound in accordance with claim 1 in which R is phenyl, $R_3$ and $R_4$ are hydrogen, and $NR_1R_2$ is piperazin-1'-yl.

12. A phthalazine compound in accordance with claim 1 in which R is phenyl, $R_3$ and $R_4$ are hydrogen, and $NR_1R_2$ is 4'-allyl-piperazin-1'-yl.

References Cited

UNITED STATES PATENTS

| 3,274,185 | 9/1966 | Sigal et al. | 260—250 A |
| 3,012,033 | 12/1961 | Engelbrecht et al. | 260—250 A |
| 2,484,029 | 10/1949 | Hartmann et al. | 260—250 A |

ALEX MAZEL, Primary Examiner

JOSE TOVAR, Assistant Examiner

U.S. Cl. X.R.

260—247.5 B; 424—250

UNITED STATES PATENT OFFICE
CERTIFICATE OF CORRECTION

Patent No. 3,753,988      Dated August 21, 1973

Inventor(s) Ronald Ernest Rodway et al

It is certified that error appears in the above-identified patent and that said Letters Patent are hereby corrected as shown below:

Column 3, line 70, the formula

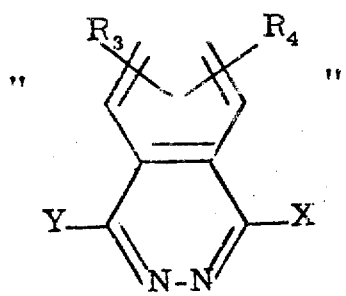 " should be -- 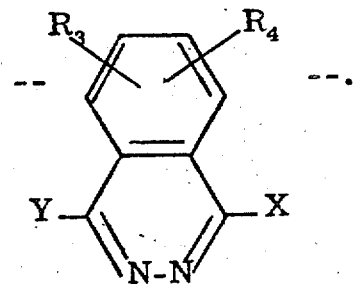 --.

Column 9, line 60, the formula

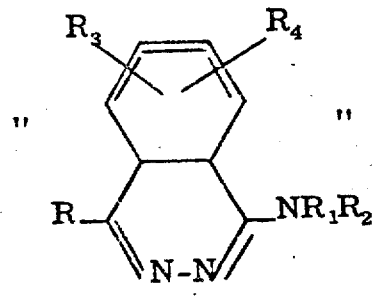 " should be -- 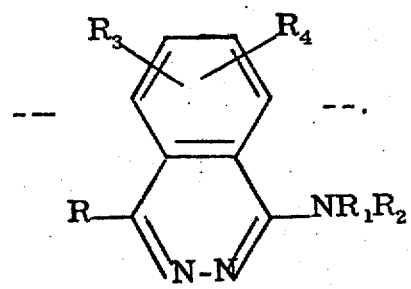 --.

Column 10, claim 4, line 21, please delete "[4'(β"-hydroxypropyl)piperazine-1-yl]"; claim 8, line 35, please delete "[4'-(β"-hydroxyethyl)piperazine-1-yl]"; claim 10, line 43, ".2" should be —(2--.

Signed and Sealed this

Fifth Day of October 1976

[SEAL]

Attest:

RUTH C. MASON
Attesting Officer

C. MARSHALL DANN
Commissioner of Patents and Trademarks